Patented Aug. 10, 1926.

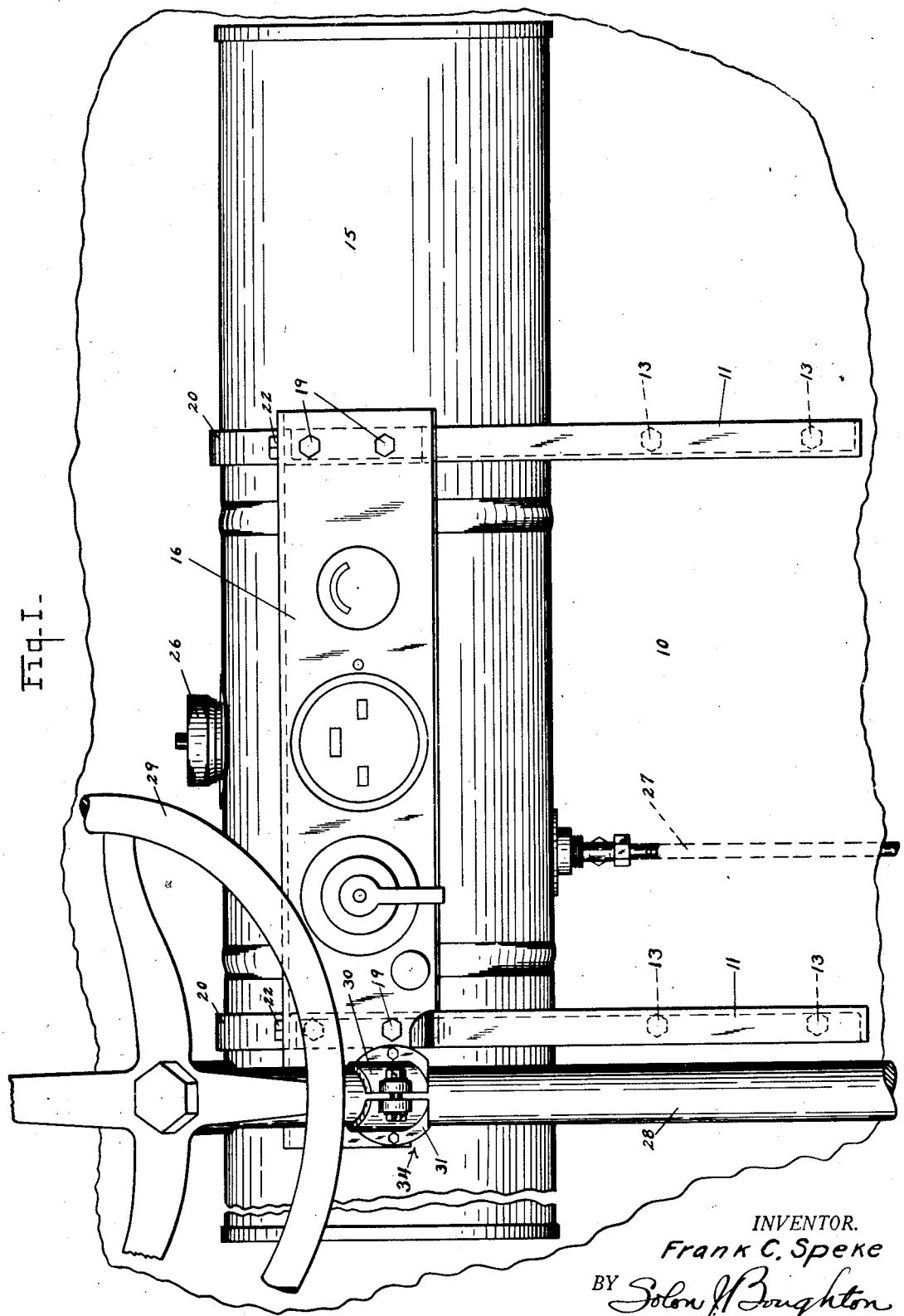

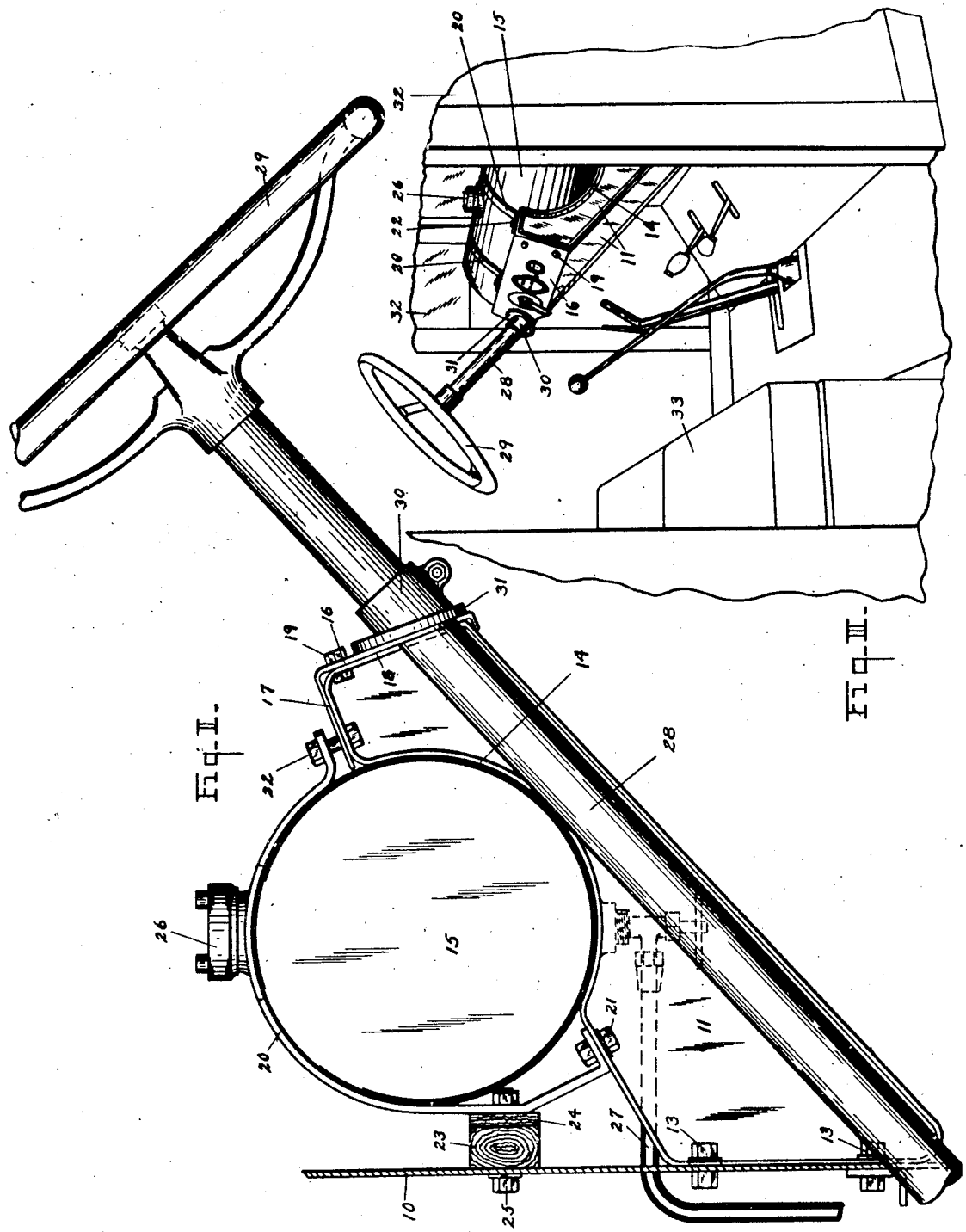

1,595,579

UNITED STATES PATENT OFFICE.

FRANK C. SPEKE, OF TOLEDO, OHIO, ASSIGNOR TO THE WILLYS-OVERLAND COMPANY, OF TOLEDO, OHIO, A CORPORATION OF OHIO.

MOTOR VEHICLE.

Application filed September 17, 1923. Serial No. 663,195.

This invention relates to motor vehicles, and has for its object to provide an improved fuel tank supporting structure adapted to be carried by the dash in the rear thereof.

Another object of the invention is to provide means for supporting the tank rearwardly of the dash, in a manner to utilize the instrument board for bracing the tank supporting members.

Another object of the invention is to extend a plurality of tank supporting arms upwardly and rearwardly from the dash or from other transversely extending members mounted upon the vehicle frame, and to provide means for clamping the tank upon said arms.

Other objects, and objects relating to details of construction and economies of manufacture, will appear from the description of that embodiment of the invention, which, for the purposes of the present application, I have illustrated in the accompanying drawings, in which:

Figure I is a transverse elevational view looking toward the front of the vehicle, showing the dash with the fuel tank mounted in rear thereof.

Fig. II is a side elevation partly in section, showing the dash and the arms extending therefrom, together with the means for bracing the arms and for securing the tank thereon.

Fig. III is a view in perspective, illustrating the relative positions of the driver's seat and fuel tank mounting within the vehicle body.

The present invention is applicable to various types of motor vehicle bodies, but is intended preferably for use with vehicles of the commercial type, such as delivery wagons, trucks and the like.

The invention has to do with the particular manner of supporting the fuel tank within the body of the vehicle upon the rear side of the dash. The illustrated embodiment of the invention includes a dash 10 and a pair of rearwardly extending and upwardly inclined arms 11 suitably secured to the dash as by means of the bolts 13. The arms are preferably in the form of stampings having depressed curved bearing portions 14 conforming to the contour of the tank 15 and extending partly around the tank at the lower side thereof. The rear ends of the arms are suitably connected and braced, preferably by means of the instrument board 16, which is provided with a flange 17 seated upon the top flanges of the arms 11 in rear of the tank, the instrument board being secured to the end flanged portions 18 of the arms by means of the bolts 19. The tank is clamped upon the arms by the bands or straps 20 extending over the top thereof and connected with the arms by the bolts 21 and 22, as shown in Fig. II, the bolts 22 also extending through the flange 17 of the instrument board, and serving to retain the same upon the arms. The length of the strap is such as to afford a certain amount of clearance between the rear ends thereof and the flange 17 of the instrument board, whereby the bolts 22 may be tightened to draw the strap into clamping engagement with the tank. The tank and the arms supporting the same may be braced vertically by any suitable means, preferably such as the wood filler blocks 23 and 24 extending between the dash and the downwardly projecting front portions of the straps 20, said blocks being secured by bolts 25, as shown in Fig. II. Relatively thick and thin blocks are used to take care of any variation that may occur in the distances between the dash and straps 20 from time to time. Since the blocks are constructed of wood, they serve to decrease the noise that otherwise might be produced by the use of metal braces employed at these points.

The tank is provided with a suitable filler cap 26 and with an outlet connection 27 leading to the carburetor of the engine (not shown).

The steering column 28, carrying the steering wheel 29, is extended upwardly through the dash in the usual manner, and is supported by a sleeve 30 clamped thereon, having a flange 31 connected with the instrument board by suitable bolts, as shown in Fig. I. The instrument board is provided with a semi-circular opening to receive the steering column, and is cut away just below the opening, as indicated at 34 in Fig. I, to permit the steering column to be dropped down when it is desired to disconnect and remove it from the vehicle.

The instrument board is provided with the usual indicating and control devices, the connections leading therefrom not being shown.

The tank is mounted between the side walls 32 of the vehicle, which extend rearwardly from the dash to the door opening, as shown in Fig. III. The length of the tank is preferably made substantially equal to the full width of the body inside, thus permitting a tank of relatively small diameter to be used, one which can be placed relatively high up on the dash, thereby insuring ample room for the legs of the occupant of the vehicle, thus permitting the seat 33 to be positioned relatively close to the dash to afford the maximum amount of room in rear of the seat for the merchandise to be carried by the vehicle.

While I have shown and described in considerable detail, a specific embodiment of my invention, it is to be understood that this showing and description is illustrative only and for the purpose of rendering my invention clear, and that I do not regard the invention as limited to the details of construction illustrated and described, except in so far as I have included such limitations within the terms of the following claims, in which it is my intention to claim all novelty inherent in my invention broadly, as well as specifically.

I claim as my invention:

1. In a motor vehicle, the combination of vehicle side walls, a dash, a fuel tank inclosed by said walls in spaced relation thereto, arms projecting rearwardly from the dash and adapted to extend partly around the tank to support the same independently of said side walls, a steering column adjacent one of said arms, an instrument board secured to said arms, said instrument board having its end portions in spaced relation to said side walls, and a bracket on said instrument board for supporting said steering column.

2. In a motor vehicle, the combination of vehicle side walls, a dash, a fuel tank with its end portions between and adjacent said side walls, arms projecting rearwardly from the dash and adapted to extend beneath the tank in supporting engagement therewith, straps extending over the top of the tank and connected with the arms to clamp the tank thereon, and an instrument board connecting the arms adjacent their rear ends, said instrument board terminating short of the ends of the tank and having its end portions disposed in spaced relation to said vehicle side walls.

In testimony whereof, I affix my signature.

FRANK C. SPEKE.